United States Patent [19]
Reams

[11] Patent Number: 5,907,793
[45] Date of Patent: May 25, 1999

[54] TELEPHONE-BASED INTERACTIVE BROADCAST OR CABLE RADIO OR TELEVISION METHODS AND APPARATUS

[76] Inventor: David A. Reams, P.O. Box 502, Perrysburg, Ohio 43552

[21] Appl. No.: 08/510,900

[22] Filed: Aug. 3, 1995

Related U.S. Application Data

[63] Continuation-in-part of application No. 08/127,140, Sep. 27, 1993, abandoned, which is a continuation-in-part of application No. 07/877,078, May 1, 1992, abandoned.

[51] Int. Cl.⁶ ........................................................ H04H 1/00
[52] U.S. Cl. ............................ 455/3.1; 455/4.2; 455/45; 348/7; 348/13
[58] Field of Search ................................ 455/2, 3.1, 3.2, 455/4.2, 5.1, 6.1, 6.2, 6.3, 186.1, 45, 46, 66; 348/1, 5, 6, 7, 12, 13

[56] References Cited

U.S. PATENT DOCUMENTS

| | | | |
|---|---|---|---|
| 4,071,697 | 1/1978 | Bushnell | 379/88 |
| 4,499,601 | 2/1985 | Mathews | 455/2 |
| 4,591,906 | 5/1986 | Morales-Garza et al. | 348/13 |
| 4,630,108 | 12/1986 | Gomersall | 455/6.3 |
| 4,755,871 | 7/1988 | Morales-Garza et al. | 348/13 |
| 4,807,031 | 2/1989 | Broughton et al. | 348/460 |
| 4,876,592 | 10/1989 | Von Kohorn | 348/13 |
| 4,890,322 | 12/1989 | Russell, Jr. | 455/5.1 |
| 4,907,273 | 3/1990 | Widermer | 455/2 |
| 5,023,934 | 6/1991 | Wheelers | 455/45 |
| 5,063,610 | 11/1991 | Alwadish | 455/45 |
| 5,101,267 | 3/1992 | Morales-Garza et al. | 348/13 |
| 5,134,719 | 7/1992 | Mankovitz | 455/186.1 |
| 5,146,612 | 9/1992 | Grosjean et al. | 455/45 |
| 5,239,540 | 8/1993 | Rovira et al. | 455/45 |

Primary Examiner—Thanh Cong Le

[57] ABSTRACT

An interactive broadcast or cable radio or television system includes methods for transmitting a telephone number to a receiving apparatus with receiver antenna and telephone-autodialer, to receive and autodial transmitted telephone number, transmitted code identification of an interactive, response-activated or emergency alert response speech synthesizer and transducer to reproduce predetermined dat representative activated by responding with at least one response option such as at least one response mode to activate a voice message addressed to the receiver or to purchase or order at least one product, service or program element, to request information concerning at least one product, service or program element or to make voice contact with an agent or marketing representative for at least one associated product, service or program element and further to purchase or order, request information concerning or make voice contact with an agent or marketing representative for at least one product, service or program element displayed in product/service or program element listings scrolled as text.

55 Claims, 2 Drawing Sheets

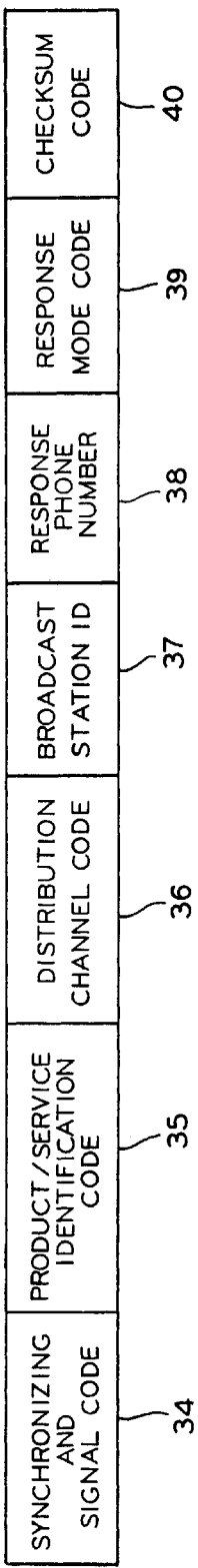
FIGURE 2   ACTIVE BROADCAST CODE FORMAT
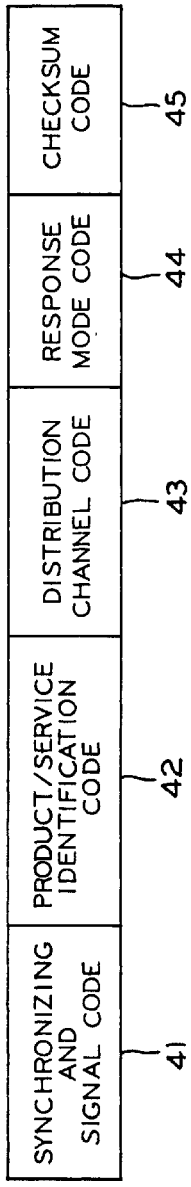
FIGURE 3   PASSIVE BROADCAST CODE FORMAT
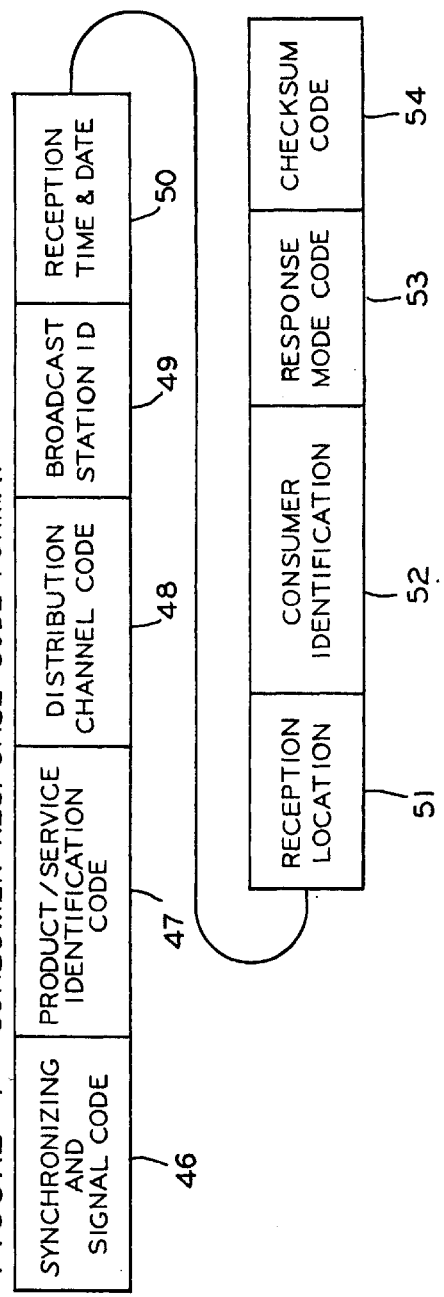
FIGURE 4   CONSUMER RESPONSE CODE FORMAT

TELEPHONE-BASED INTERACTIVE BROADCAST OR CABLE RADIO OR TELEVISION METHODS AND APPARATUS

RELATED APPLICATIONS

This application is a continuation-in-part of application Ser. No. 08/127,140, filed Sep. 27, 1993 and now abandoned, which was a continuation-in-part of then application Ser. No. 07/877,078, filed May 1, 1992 and abandoned.

TECHNICAL FIELD

This invention relates to the field of telephone communications and speech synthesis used for interactive broadcast or cable radio or television communications and in particular consumer interaction with radio or television program material.

SUMMARY AND BACKGROUND ART

Interactive electronic marketing systems in prior art have focused and been designed for use by television viewers and broadcast radio listeners viewing a display screen or at least without exploiting speech synthesis techniques. See Gomersall, U.S. Pat. No. 4,630,108; Wiedemer, U.S. Pat. No. 4,907,273; Von Kohorn, U.S. Pat. No. 4,876,592; Bushnell, U.S. Pat. No. 4,071,697; Morales-Garza, U.S. Pat. No. 5,101,267; Morales-Garza, et al, U.S. Pat. Nos. 4,591,906 and 4,755,871; Broughton, U.S. Pat. No. 4,807,031; Russell, Jr., U.S. Pat. No. 4,890,322; Wheeless, U.S. Pat. No. 5,023,934; Matthews, U.S. Pat. No. 4,499,601; Mankovitz, U.S. Pat. No. 5,134,719; Grosjean, et al, U.S. Pat. No. 5,146,612; Alwadish, U.S. Pat. No. 5,063,610.

Bushnell, U.S. Pat. No. 4,071,697 uses a speech synthesizer in an interactive video/telephone transmission system in a very limited manner, related solely to confirming purchases. Coats, U.S. Pat. No. 5,177,800 discloses another speech synthesis technique used in interactive communications.

One problem with prior art electronic interactive marketing systems is that they rely on visual means and do not extensively use speech synthesizer voice delivery (as the instant invention does), thereby requiring extensive viewing to interact. By extensively using speech synthesis capabilities the instant invention provides for the first time practical and convenient means for consumers to interact without substantial visual display with program material heard or viewed via respective broadcast or cable radio or television tuner means. Further, consumers may be connected to a processing computer by wireless communications means, especially those driving automobiles listening to the car radio, to safely interact with program material in a wide variety of ways and in a multi-tiered interactive manner. Moreover, by extensively using said speech synthesis capabilities this invention frees television viewers and radio listeners at fixed locations from having to extensively view a display screen. In this invention the apparatus user need only glance at a display (LED or LCD) to see whether a telephone response option is available to be made.

The instant invention, in one embodiment disclosed herein, effectively encourages said apparatus user to respond to interact with program material through speech synthesizer voice delivered messages, information or prompts. No prior art accomplishes this. Morales-Garza, U.S. Pat. No. 5,101, 267 and Morales-Garza, et al, U.S. Pat. Nos. 4,591,906 and 4,755,871, while providing means for a pushbutton affirmative response to surveys conducted or questions asked over the television broadcast media, has no provision to encourage responses and actually improve response rates through speech synthesizer voice delivered prompts.

Likewise, Alwadish, U.S. Pat. No. 5,063,610, while providing broadcast radio listeners means to request coupons at the push of a button, has no provision to improve response rates and the number of listeners requesting coupons through speech synthesizer voice delivered prompts such as "press button for [product] coupons". The instant invention further improves response rates by prompting during order entry or information request specification (see described below) when an unavailable specification is entered.

The instant invention enables merchants marketing a product or service over broadcast or cable radio or television to use a speech synthesizer to voice deliver (via stored or transmitted map information and locator data generated by the receiving apparatus) to consumers, particularly those driving automobiles, directions to a store selling said marketed product or service. Gomersall, U.S. Pat. No. 4,630,108 in view of Wiedemer, U.S. Pat. No. 4,907,273 discloses an interactive marketing system using a locator code for visual not voice delivery of location information, thereby lacking provision for mobile, i.e. car, broadcast radio listeners to benefit from such locator functionality.

Further, this invention enables consumers to text scroll subject category listings of a plurality of products, services or program elements and activate autodial of telephone numbers a pre-programmed voice message announcing in predetermined manner the product/service or program element scroll mode. Hashimoto, U.S. Pat. No. 5,075,771 and Toru Baji, et al, U.S. Pat. No. 5,029,014 both provide program listings that are visually displayed without voice delivery as in the instant invention.

In addition, said prior art does not provide a means for pre-selecting interactive applications when a program listing of interest is scrolled. The instant invention, however, provides the capability of pre-selecting ordering and information specifications concerning program listings of interest when said listings are scrolled.

The instant invention's pre-selecting functionality thereby enables consumers who will not be listening to or watching a respective broadcast or cable radio or television tuner when a particular program element of interest is scheduled to air or be transmitted to still be able to interact, e.g. order or inquire about a product or service marketed in such program element. In addition, this program listing functionality is intended to simply inform consumers of the station or facility and time scheduled for airing or transmission of a program element so that such consumers can then tune in that station or facility at the scheduled time to interact as disclosed herein.

For all electronic orders and voice contact communications and electronic information request communications disclosed herein a data receive-tuner (radio or television) is interfaced to a telephone communications device. This invention provides at least one consumer or respondent with the built-in authentication and security system already used by such communications device, thereby eliminating the need for said data receive-tuner to have a separate authentication and security system. The existing authentication, security or encryption system used by a broadcast cable radio or television system interfaced to such data-receive tuner may alternatively be used to authenticate apparatus users.

Further, the instant invention uses the same speech synthesizer-based system used for interactive electronic marketing to provide an emergency alert system (EAS) message warning system. This EAS message warning system is designed in accordance with the Federal Communications Commission's EAS rules and regulations articulated in 47 CFR Part 11. The instant invention entails a two-step warning system: the first step is designed to visually alert at least one consumer that data representative of an EAS message has been received and is being stored in the data-receive tuner, which visual alert is activated by predetermined data received by said data-receive tuner; the second step is audibly reproducing said stored data representative of said EAS message, which audible reproduction is activated by said responding as disclosed herein.

OBJECTS OF THE INVENTION

A design object of the instant invention is to use the same speech synthesizer-based technology for both interactive and EAS communications. Related objects of the instant invention are to 1) visually alert at least one consumer that an EAS message has been received and is being stored by a data-receive tuner and, upon consumer activation audibly reproduce said message and 2) provide source data addressing and receiver location sensing means so that only data-receive tuners in geographic areas affected by the emergency event referenced in an EAS message store said EAS message.

Another object of the present invention is to deploy speech synthesis to provide a means of improving the rate of consumer response to a given interactive program element. A related object of the present invention is to encode data codes controlling speech synthesizer voice delivery in such a way that said voice delivery is coordinated at predetermined appropriate sounding times either immediately before, during or immediately after the broadcast or transmission of said program element.

Another object of the present invention is to provide consumers with means for electronically purchasing, ordering or requesting information concerning one or a plurality of products, services or program elements. A further related object of the instant invention is to provide a practical, convenient and safe means for broadcast radio listeners who are driving automobiles or otherwise engaged in some mobile activity to conveniently, practically and safely interact with broadcast program audio.

Yet a further object of the instant invention is to provide an unique program listing functionality that displays a plurality of products, services or program elements by one or a plurality of respective pre-assigned subject categories as text to be scrolled wherein upon selecting a subject category listing user activates telephone autodial concerning at least one listed product, service or program element. A related object of the present invention is to enable consumers to pre-select listed program elements—before scheduled airing or transmission—as well as optionally respective ordering and information specifications as said listings are scrolled or, alternatively, to tune in a specified station or facility at a specified time to interact with a listed program element as said program element is airing or transmitted.

Another object of the instant invention is to integrate a data-receive tuner (radio or television) with a telephone communications device to enhance the value of such telephone communications device. A related object is to use the authentication and security system of said telephone communications device, or the security or encryption system used in a respective broadcastor cable radio or television system interfaced to said data-receive tuner, for authentication and user security with respect to the electronic ordering, information request and voice contact response options disclosed herein.

BRIEF DESCRIPTION OF THE DRAWING

The above-referenced and other objects, advantages and novel features of the present invention are apparent from the following detailed description of the preferred and other embodiments of the present invention illustrated in the accompanying drawing. While said drawing is specific to broadcast radio data transmission means it is understood that the principles underlying said drawing and the principles disclosed herein apply equally to broadcast or cable radio or television data transmission means.

FIG. 2 is a diagram showing the items and order of data sent in one embodiment disclosed herein in the system of FIG. 1 by an attributed broadcast radio station to a receiving apparatus, the Receiver Data Processing Unit ("RDPU") of FIG. 1;

FIG. 3 is a diagram showing the items and order of data sent in one embodiment in the system of FIG. 1 through an unattributed broadcast radio station to the RDPU of FIG. 1;

FIG. 4 is a diagram showing the items and order of data sent in one embodiment from the RDPU of FIG. 1 to the computer 32 of FIG. 1.

DESCRIPTION OF THE PREFERRED AND OTHER EMBODIMENTS

I. System Overview

Figure 1:
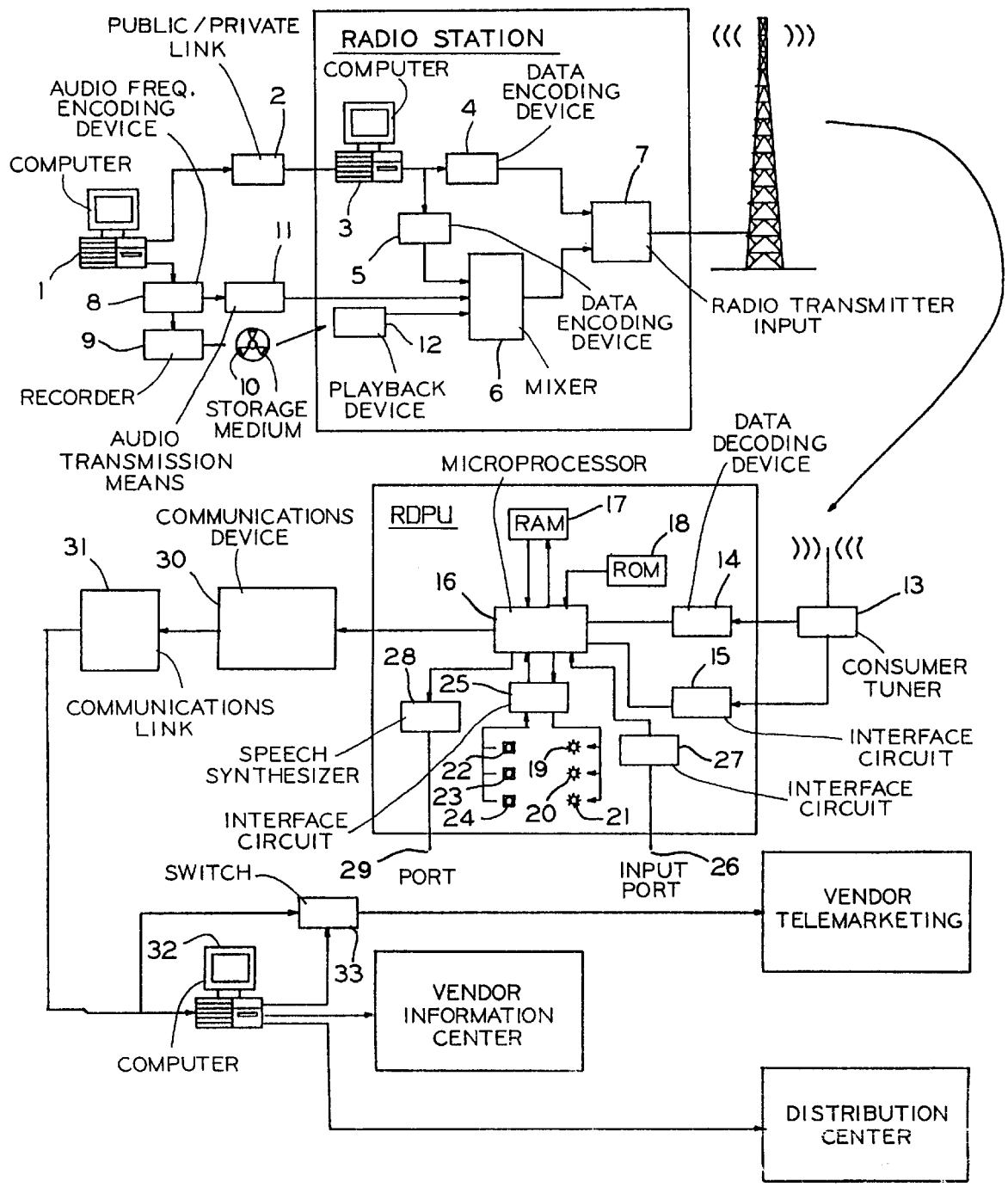
FIG. 1 is a block diagram illustrating the entire response system in accordance with the principles of the present invention, from data production to response processing.

Several methods and an apparatus for interactive or emergency alert broadcast or cable radio or television are disclosed herein. Said methods entail encoding via data encoding device 4/5 for transmission via predetermined broadcast or cable radio or television data transmission means at least one source data set of predetermined format including one or plurality of portions each with a pre-assigned purpose wherein said at least one source data set includes a telephone number and a response mode coda 39/44 identifying one or plurality of predetermined response modes such as responses or response options available to be made, in one preferred embodiment with respect to one or plurality of broadcast or cable radio or television program elements such as musical recordings, videos, songs, shows or other program material intended to entertain, live or recorded speech intended to inform or short announcements or commercial advertisements, political advertising, public service announcements, emergency test or alert (emergency alert system or EAS) messages or other messages ("program elements") or one or plurality of respective products or services associated with or marketed in said one or plurality of program elements. Further, said at least one source data set may include data representative of a message, prompt or information to be voice delivered.

i. SOURCE DATA TRANSMISSION MEANS

Broadcast or cable radio or television station or facility transmits said at least one source data set via said predetermined broadcast or cable radio or television data transmission means at respective one or plurality of predetermined times to respective broadcast or cable radio or television tuner 13. Said predetermined broadcast or cable radio or television data transmission means may encompass any such data transmission means.

For television, said data transmission means may encompass conventional horizontal blanking interval (HBI), vertical blanking interval (VBI) or subcarrier (SCA) data transmission means. See L. Martinez, U.S. Pat. No. 5,321,514 disclosing said television data transmission means, which is incorporated herein by reference. For cable television, said data transmission means may be in-band or out-of-band data transmission as disclosed in F. H. Auld, Jr., et al, U.S. Pat. No. 5,257,396, which is incorporated herein by reference. Further, a CATV system billing computer (as disclosed in R. J. Beyers, II, et al, U.S. Pat. No. 5,420,923, which is incorporated herein by reference) may be used to bill RDPU users ordering said one or plurality of products, services or program elements.

Said one or plurality of products, services or program elements may include videos for "video on demand" as disclosed in G. C. Bradley, et al, U.S. Pat. No. 5,172,413, which is incorporated herein by reference. Further, videos on demand may be selected from a plurality of listings of videos available on demand via the product/service/program element listing/text scroll method disclosed below. The authentication or security system used in such electronic ordering, other electronic ordering or information request may be the same authentication, security or encryption system used by the cable television system such as disclosed in G. C. Bradley, et al, U.S. Pat. No. 5,172,413, which is incorporated herein by reference For radio, said data transmission means may encompass conventional radio broadcast data service (RBDS aka radio data system or RDS) or FM subcarrier (SCA) data transmission means. See "Info Radio", Steve Gibbs, *Car Audio and Electronics*, August 1995, p. 97 for description of RBDS, which is incorporated herein by reference. Said RBDS or RDS broadcast radio data transmission means provides a convenient means for avoiding delay in interactivity when said at least one consumer changes the frequency to which tuner 13 is tuned, e.g. said delay caused by having to await reception of said at least one source data set to interact at a frequency tuned to: said RBDS or RDS system addresses this problem by its Enhanced Other Network (EON) Programme Identification standard wherein data concerning currently airing program material of other broadcast radio stations in a given geographic area is identified and encoded in each broadcast radio station's RBDS Programme Identification data set. See Wiedemann, et al, U.S. Pat. No. 5,345,602 for disclosure of this RBDS or RDS feature, which is incorporated herein by reference. Alternatively, any such delay in interactivity may be minimized by sending several of said at least one source data sets during the airing or transmission of associated program material.

Said at least one source data set may be embedded in program audio, such as via PSK or FSK modulation, enabling AM as well as FM broadcast radio stations to actively participate and transmit said at least one source data set as disclosed herein. DAB data transmission, satellite or terrestrial based, may be used with DAB tuners 13. See *DIGITAL RADIO BASICS*, Skipp Pizzi, Telephony Div. Intertec Publishing Corp., 1992 for description of DAB, which is incorporated herein by reference.

While any means for respective broadcast or cable radio or television data transmission may be used with the methods and apparatus claimed herein, one preferred method of transmitting data via said respective broadcast or cable radio or television data transmission means is transmitting said at least one source data set as AFSK data transmitted in the main audio channel of the transmitting broadcast or cable radio or television station or facility (said term "facility" includes frequency or channel). Said AFSK data transmission method is preferred because A) said AFSK data transmission method can be used equally by broadcast and cable radio and television stations or facilities, e.g. via AFSK transmitter at data encoding device 4/5 and AFSK receiver built into conventional broadcast or cable radio or television tuner 13, thereby cost effectively enabling construction of substantially the same RDPU for broadcast and cable radio and television RDPUs and B) said AFSK data transmission method is mandated by the Federal Communications Commission in 47 CFR Part 11 to be implemented by broadcast and cable radio and television stations and facilities to comply with the Commission's new rules and regulations implementing an "Emergency Alert System" or EAS to replace the "Emergency Broadcast System" or EBS. See generally 47 CFR Part 11 for discussion of said new rules and regulations, which is incorporated herein by reference; also see EAS functionality disclosed below. While consumer tuners are not required to be equipped with said AFSK receivers to receive AFSK transmissions, broadcast and cable radio and television stations and facilities are required to transmit data via said AFSK transmitter, thus this invention provides means for receiving said AFSK transmitted data.

ii. RESPONSE MODE CODE

In one preferred embodiment said one or plurality of predetermined response options identified in response mode code 39/44 include or includes one or plurality of the following response options:

A) to purchase or order said one or plurality of products, services or program elements identified in product/service identification code 35/42, B) to request information concerning said one or plurality of products, services or program elements identified in product/service identification code 35/42 or C) to make voice contact with a predetermined representative or marketing or other agent for one or plurality of predetermined products, services or program elements.

Response mode code 39/44 may further include one or plurality of predetermined specifications available to be entered according to said respective order or information request response option selected such as for order—quantity, color, price, menu items or reservation time and for information request—coupons, certain information such as price, location or menu items, audio information such as song samples or graphic display.

iii. LPC ENCODED VOICE SIGNALS

In one embodiment said respective broadcast or cable radio or television data transmission means is a digital transmission link to digital tuner 13, e.g. DARS/DAB, HDTV or DBS tuner 13 and said at least one source data set includes linear predictive coding (LPC) encoded voice signals to be audibly reproduced via speech synthesizer 28. In LPC, speech is broken down into its important parameters, e.g. pitch, spectrum, energy and voicing and these parameters are then transmitted to a receiver which utilizes these parameters to synthesize an intelligible replica of input speech. See Fette, et al, U.S. Pat. No. 5,255,339 for discussion of LPC encoded voice signals, which is incorporated herein by reference.

Comper 1/3 may be a vocoder to encode LPC generate voice signals representative of predetermined information, a predetermined message or prompt or other audible reproduction to be audibly reproduced via speech synthesizer 28.

Alternatively, data encoding device 4/5 may be a text-to-LPC conversion system (such as that disclosed in Fette, U.S. Pat. No. 4,872,202, which is incorporated herein by reference) to LPC encode text for transmission as LPC encoded voice signals via said respective broadcast or cable radio or television data transmission means.

In addition, said LPC parameters may be broken down into dependent and independent LPC data or cepstral coefficients or linguistic content and accoustical LPC parameters. See Hermansky, U.S. Pat. No. 5,165,008 and M. I. Savic, U.S. Pat. No. 5,327,521, which are incorporated herein by reference. In one embodiment disclosed herein only dependent data or accoustical parameters are transmitted in said at least one source data set or stored in RDPU memory with corresponding respective independent cepstral coefficients or linguistic content LPC parameters stored in non-volatile RAM 17 or ROM 18 or transmitted to be mixed with said data or voice signals encoded in said at least one source data set to audibly reproduce predetermined information or a predetermined message or prompt, in one voice or for example in the pitch of a musical artist who is singing a musical composition contained in program material or in the pitch of a predetermined product/service spokesperson for an advertised product or service.

Transmitting LPC encoded voice signals via conventional AM/FM broadcast radio data transmission means may result in slow speed voice transmission. To compensate for such lack of real time voice transmission with conventional AM/FM broadcast data transmission means, said at least one source data set containing said LPC encoded voice signals may be transmitted at a predetermined time in advance of the scheduled broadcast or transmission time for a program element associated with said at least one source data set, either timed to be received by tuner 13 simultaneously with tuner 13 reception of said associated program element or transmitted in advance as program listing data as described below.

In one embodiment disclosed herein text may be transmitted in said at least one source data set such as via conventional text transmission means such as RBDS/RDS for broadcast radio or HBI/VBI for broadcast television and converted via text-to-speech speech synthesizer 28. See Vasile, et al, U.S. Pat. No. 5,289,523 for disclosure of text-to-speech conversion, which is incorporated herein by reference.

iv. APPARATUS PROCESSING, STORAGE, DISPLAY AND RESPONSE MEANS

Microprocessor 16 processes said at least one source data set in a predetermined manner. RAM 17 stores one or plurality of predetermined portions of said at least one source data set for a predetermined period of time.

In one embodiment herein RAM 17 stores one or plurality of LPC encoded voice messages or prompts in LPC speech synthesizer 28 RAM 17/ROM 18 such as that disclosed in W. L. Davis, et al, U.S. Pat. No. 4,769,642, which is incorporated herein by reference. While said prior art involves a paging system, analogous principles may be applied in the instant invention to store LPC encoded voice signals encoded in said at least one source data set, in particular said LPC signalling and individually addressed receiver voice massaging system, dual port memory means and storage address location system disclosed in said prior art. Further, the following steps and means disclosed in said prior art U.S. Pat. No. 4,769,642 may be utilized in the instant invention:

said at least one source data set may comprise variable length digitally encoded LPC voice signals including a digitally encoded LPC voice message and an end-of-message signal wherein RAM 17 is capable of storing a plurality of digitally encoded LPC voice messages and audibly reproducing via audible reproduction means including speech synthesizer 28 may further include producing voice information corresponding to stored digitally encoded LPC voice signals via speech synthesizer 28 capable of producing said voice information while RAM 17 simultaneously stores other digitally encoded LPC voice signals;

RAM 17 stores said digitally encoded LPC voice signals in an unused memory location or, when an unused memory location is unavailable, over the oldest stored digitally encoded LPC voice signals or over digitally encoded LPC voice signals that have been read and RAM 17 further simultaneously stores the address location of stored digitally encoded LPC voice signals in a predetermined memory location;

detecting or decoding device 14/15 further includes means for generating a first control signal when said at least one signalling signal included in said at least one source data set is detected and means for generating a second control signal when said end-of-message signal is decoded, RAM 17 further includes first and second memory ports wherein said first memory port is coupled to respective broadcast or cable radio or television tuner 13 for receiving said variable length digitally encoded LPC voice signals to be stored in RAM 17 together with beginning storage location information in response to said first control signal, RAM 17 further stores ending storage location information in response to said second control signal and speech synthesizer 28 is coupled to said second memory port for producing voice information corresponding to said stored variable length digitally encoded LPC voice signals;

detecting or decoding device 14/15 further may comprise address decoder means coupled to address code memory ROM 18, said address code memory ROM 18 for storing predetermined address information and said address decoder means for decoding address information included in said at least one signalling signal contained in said at least one source data set and comparing said address information with said predetermined address information stored in said address code memory ROM 18 to detect a match indicating to process said one or plurality of portions of said at least one source data set;

RAM 17 further includes an area for storing the beginning storage location information and ending storage location information corresponding to said stored variable length digitally encoded LPC voice signals, RAM 17 further stores the beginning storage location information corresponding to said stored variable length digitally encoded LPC voice signals in a predetermined memory location and speech synthesizer 28 reads said beginning storage location information for retrieving said stored variable length digitally encoded LPC voice signals for processing;

RAM 17 stores a control word representative of the predetermined status of stored digitally encoded LPC voice signals, said predetermined status comprising the order said digitally encoded LPC voice signals were received, whether said digitally encoded LPC voice signals have been read or predetermined message priority corresponding to said stored digitally encoded LPC voice signals;

speech synthesizer 28 produces analog voice signals or voice information corresponding to stored digitally encoded LPC voice signals and outputs said voice information via audio system 30 coupled to the output of speech synthesizer 28 to generate audible information and audio system 30 is responsive to detecting or decoding device 14/15 for generating a distinctive audible alerting signal indicating a predetermined voice message has been received.

Display means may display one or plurality of predetermined response options. Said display means may include LED display means comprising one or plurality of LED lights 19, 20 or 21 illuminating said one or plurality of predetermined response options identified by response mode code 39/44 as available to be made via said response means. Alternatively, said display means may include LCD or display screen means for displaying said one or plurality of predetermined responses or response options identified in response mode code 39/44.

Said response means includes one or plurality of
A) one or plurality of pushbuttons 22, 23 or 24 or key pads (not shown) activated directly or remotely via remote control means (not shown) coupled to said response means or
B) voice recognition unit (VRU) or voice activated response means (not shown). See Kimura, U.S. Pat. No. 5,226,090 for disclosure of VRU or voice-operated remote control system, which is incorporated herein by reference. Said remote control means, especially useful with television tuner 13 RDPUs, is of a conventional type such as that disclosed in L. F. Yazolino, et al, U.S. Pat. No. 5,329,370.

Said VRU response means may be integrated with speech synthesizer 28 to provide an integrated conventional voice input/output system sharing an LPC-based voice coding design. Under this embodiment, LPC encoded voice signals are sent in said at least one source data set by said respective broadcast or cable radio or television data transmission means. This allows said VRU response means to obtain VRU features directly from said encoded speech without having to extract LPC parameters from received analog voice signals. In addition, speech synthesizer 28 and said VRU may share the same vocabulary storage means, e.g. RAM 17 or ROM 18.

Said VRU may further contain automatic speech recognition means, the ability to identify individuals based on predetermined characteristics in their voices—which can then be used as a means of user authentication and security. A DSP chip 16 may be programmed for real time processing for both VRU and speech synthesis applications. See *Voice Communications Between Humans and Machines*, David B. Roe and Jay G. Wilpon, National Academy Press (1994), which is incorporated herein by reference. In one embodiment disclosed herein tuner 13 may further share said DSP chip 16 for predetermined tuner DSP (e.g. car/home stereo/television) functionality.

v. APPARATUS MUTE OR ATTENUATION AND SPEECH SYNTHESIZER MEANS

One or plurality of A) audibly reproducing via speech synthesizer 28 or B) responding via said response means activates mute or attenuation means (not shown) coupled to said respective broadcast or cable radio or television tuner 13 to mute or attenuate said respective broadcast or cable radio or television tuner 13 for one or plurality of the following respective durations A) said audible reproduction via speech synthesizer 28 or B) said responding via said response means, demuting or de-attenuating via demute or de-attenuation means (not shown) coupled to said respective broadcast or cable radio or television tuner 13 immediately at or after the completion of said respective A) audible reproduction via speech synthesizer 28 or B) responding via said response means.

Speech synthesizer 28 audibly reproduces predetermined data stored or pre-programmed in speech synthesizer 28, RAM 17 or ROM 18 or transmitted in said at least one source data set at one or plurality of
A) at least one time activated by said one or plurality of portions of said at least one source data set or
B) at least one time activated by at least one respondent responding via said response means with said one or plurality of predetermined response options.

a. VOICE CONTACT MESSAGE

In one embodiment disclosed herein said response mode code 39/44 identifies a predetermined voice contact response option as available to be made by said at least one consumer and response telephone number 38 is used in making said voice contact. Further, said display means LED 24 or LCD display means (not shown) displays said voice contact response option as an available response option. Said response means includes predetermined wire or wireless telephone communications device 30 for making said voice contact and said responding via said response means inputs said response telephone number 38 to automatic dial means (not shown) coupled to predetermined telephone communications device 30 to be automatically dialed via a predetermined telephone communications network 33 coupled to predetermined voice communications device 30 and activates said audible reproduction via speech synthesizer 28 wherein said audible reproduction may comprise a predetermined message concerning the call status of said telephone call such as party or number called, carrier, dialing, ringing, busy or redialing.

In one embodiment disclosed herein speech synthesizer 28 may be of a type containing DTMF conversion means to convert response telephone number 38 into DTMF dialing signals to dial said response telephone number 38 via said automatic dial means. Such a speech synthesizer 28 may be the TSP5OC0x/1x Family Speech Synthesizer manufactured by Texas Instruments.

b. PURCHASE/ORDER AND INFORMATION REQUEST AUDIBLE REPRODUCTION

In another embodiment disclosed herein response mode code 39/44 further identifies a predetermined A) purchase or order or B) information request response option as available to be made by said at least one consumer to respectively purchase/order or request information concerning said one or plurality of products, services or broadcast or cable radio or television program elements. In this embodiment said display means displays response mode code 39/44 identifying said A) purchase or order or B) information request response option as available to be made. Further, responding via said response means activates said audible reproduction via speech synthesizer 28 wherein said audible reproduction further comprises a predetermined message concerning said A) purchase or order of or B) information request concerning said one or plurality of products, services or program elements.

In another embodiment response mode code 39/44 further identifies a predetermined information request response option as available to be made by said at least one consumer to request predetermined information concerning said one or plurality of products, services or broadcast or cable radio or television program elements. Said display means displays response mode code 39/44 identifying said information request response option as available to be made. Further, said responding via said response means activates said audible reproduction via speech synthesizer 28 wherein said audible reproduction further comprises said predetermined information.

In another embodiment response mode code 39/44 further identifies a predetermined purchase or order response option as available to be made by said at least one consumer to purchase or order said one or plurality of products, services or broadcast or cable radio or television program elements. In this embodiment said display means displays said response mode code 39/44 identifying said purchase or order response option as available to be made and said responding via said response means activates said audible reproduction via speech synthesizer 28 wherein said audible reproduction may further comprise at least one predetermined prompt prompting in a predetermined manner said at least one respondent to further respond to enter via said response means one or a plurality of desired purchase or order specifications such as quality, size, price, color, menu items or reservation time desired.

In yet another embodiment response mode code 39/44 further identifies a predetermined information request response option as available to be made by said at least one consumer to request information concerning said one or plurality of products, services or broadcast or cable radio or television program elements. Further, said display means displays said response mode code 39/44 identifying said predetermined information request response option as available to be made and said responding via said response means activates said audible reproduction via speech synthesizer 28 wherein said audible reproduction may further comprise at least one predetermined prompt prompting in a predetermined manner said at least one respondent to further respond to enter via said response means one or a plurality of types of information desired such as coupons, graphic display, predetermined text or audio information or menu items.

In another embodiment disclosed herein said audible reproduction via speech synthesizer 28 further comprises at least one predetermined prompt for said at least one consumer to respond via said response means wherein said response means includes one or plurality of the following means to respond to said at least one predetermined prompt:

A) affirmative response pushbutton 22 means to respond to said at least one predetermined prompt;

B) key pad means (not shown) to respond to said at least one predetermined prompt or C) voice recognition unit or voice activated response means (not shown) to respond to said at least one predetermined prompt.

When said responding via said response means is with at least one response option that is unavailable to be made, said responding via said response means may activate said audible reproduction via speech synthesizer 28 wherein said audible reproduction comprises a message alerting said at least one respondent that said at least one response option made is unavailable to be made. In such embodiment said at least one response option made via said response means may be either a response option that is unavailable to be made pursuant to said response mode code 39/44 or a response to said prompt that is unavailable to be made such as said order entry or information request specifications entered via said response means that are unavailable. Said response mode code 39/44 may include data indicating all available responses to prompts such as all of said available order entry or information request specifications that are available to be made via said response means.

In another embodiment said one or plurality of response options available to be made include or includes A) purchasing or ordering or B) requesting information with respect to said one or plurality of products, services or broadcast or cable radio or television program elements. Said at least one source data set further includes a product/service identification code 35/42 identifying said one or plurality of products, services or program elements and at least one electronic response address corresponding to computer 32 intended to receive said A) purchase or order or B) information request response option via predetermined communications device 30 coupled to microprocessor 16.

Further, in said embodiment, data generating means coupled to microprocessor 16 generates a response data set wherein said response data set includes A) said product/service identification code 47 identifying said one or plurality of products, services or program elements to which said at least one consumer is responding, B) a response mode code 53 identifying the purchase/order or information request response made, C) any respective specification details entered via said response means comprising one or plurality of predetermined specifications desired such as for orders—quantity, color, price, menu items or reservation time desired and for information request—coupons, certain information such as price, location or menu items, audio information such as song samples or graphic display and D) an identification code 52 or data identifying said at least one consumer.

Said data generating means may further generate said response data set containing a broadcast or cable radio or television station or facility identification code 49 identifying at least one predetermined broadcast or cable radio or television station or facility transmitting said at least one source data set via said predetermined broadcast or cable radio or television data transmission means. Microprocessor 16 then inputs said response data set to predetermined communications device 30 to be transmitted via predetermined wire or wireless communications link 31 to said electronic response address to computer 32 for predetermined processing.

vi. RESPONSE COMMUNICATIONS MEANS

In one embodiment disclosed herein said response means includes telephone communications device 30 such as voice communications device 30 for voice contact response means or data communications device 30 for purchase/order or information request response means. In said embodiment telephone communications device 30 may comprise wire communications link 31 such as landline telephone or cellular radio communications link 31.

In one preferred embodiment data receive-tuner 13 (radio or television) is built into telephone communications device 30—to enhance the value of telephone communications device 30 to consumers. Further, for the electronic ordering, information request and voice contact applications disclosed herein, the existing authentication and security system used by said telephone communications device 30 may be used for said electronic marketing applications.

For example, data receive-tuner 13 may be built into a broadband cellular radio telephone providing full, three response option interactive functionality—electronic ordering, information request and voice contact as disclosed herein. With said data-receive tuner 13 integrated into telephone communications device 30 said at least one consumer authorized to use said RDPU may use the same authentication or security system to authenticate users and provide system security as used by said telephone communications device 30, such as, for cellular radio communications link 31, the user validation system disclosed in H. E. Simpson, et al, U.S. Pat. No. 5,404,580 and/or authentication system disclosed in M. B. Flanders, et al, U.S. Pat. No. 5,239,294, which are both incorporated herein by reference.

Further, in said integrated data-receive tuner 13/telephone communications device 30, said RDPU may share any and all RDPU means including power source means, processing means, RAM 17/ROM 18 memory means, display means (LED 22, 23 or 24 or LCD), response means (pushbutton 22, 23 or 24, key pad or VRU), DTMF signaling system for said response means, automatic dialing means, speech synthesizer 28, memory scroll means, mute/attenuation means or other means in said telephone device 30. In said example of said integrated data-receive tuner 13/cellular radio telephone communications device 30, said shared design may be as disclosed in J. L. Kowalski, U.S. Pat. No. 5,095,503, which is incorporated herein by reference.

While the modulation system utilized in telephone communications device 30 may be any suitable modulation/transmission system, one such system may be Asynchronous Time Division Multiplexing (ATDM aka statistical multiplexing). ATDM uses data transmission frames to send data in predetermined time slots. One advantage of ATDM is that empty frames, such as an order response data set without order entry specifications, may be removed from the response data stream FIG. 4. Code 52 may be a time slot the RDPU is pre-assigned to transmit in.

vii. EAS RESPONSE OPTION AUDIBLE REPRODUCTION

In another embodiment response mode code 39/44 identifies an EAS message response mode to activate a visual alert for consumer activation of reproduction of a predetermined emergency alert system or EAS message. Pursuant to 47 CFR Part 11.31, said EAS message may be any of the following "events" for one or plurality of respective affected geographic areas:

emergency action notification/termination; national information center; tornado watch/warning; severe thunderstorm watch/warning; severe/special weather statement; flash flood watch/warning/statement; flood watch/warning/statement; winter storm watch/warning; blizzard warning; high wind watch/warning; hurricane watch/warning/statement; tsunami watch/warning; evacuation immediate; civil emergency message.

In said EAS response mode embodiment, said at least one source data set further includes data representative of said predetermined EAS message. Further, RAM 17 stores said data representative of said predetermined EAS message. Said display means displays said EAS message response mode such as via a flashing red LED.

Said data representative of said EAS message may be data such as an AFSK tone burst activating a stored EAS message, preferably stored as LPC encoded voice signals to obtain the most natural sounding voice. Alternatively, said data representative of said EAS message may be LPC encoded voice signals representative of said predetermined EAS message transmitted in said at least one source data set. Further, in this embodiment, push button activation means said response mode code activates audible reproduction via speech synthesizer 28 wherein said audible reproduction comprises said predetermined EAS message.

In this and other embodiments said at least one signalling signal further includes a portion identifying an individual RDPU or geographic address information for the receiver address of respective broadcast or cable radio or television tuner 13 intended to receive and process said at least one source data set. Decoding or detecting device 14/15 detects said address information. Further, tuner 13 may be coupled to location sensing means such as GPS or LORAN C receiver means, cell location identifier means or zip code identifier means (not shown). Under said EAS response mode embodiment, said receiver address information and location sensing means enable only RDPUs located in geographic areas affected by a given emergency EAS event referenced in said predetermined EAS message to detect and store said data representative of said predetermined EAS message. As discussed further below said location sensing means has additional utility with respect to non-EAS response modes.

viii. PRODUCT/SERVICE/PROGRAM ELEMENT LISTING: TEXT SCROLL

In one embodiment data encoding device 4/5 encodes or a plurality of said source data sets and in a predetermined header portion of each of said one or plurality of source data sets said data encoding device 4/5 encodes predetermined data identifying plurality of predetermined subject categories pre-assigned to categorize each of said one or plurality of source data sets. Said subject categories may include such items as appliances, automotive, computer, grocery, restaurants, etc. categorizing one or a plurality of products or services advertised in said one or plurality of program elements or conventional "yellow page" listings of products and services. Said at least one source data set further may include specific product/service or program element listing text data representative of predetermined product, service or program element listing information. In addition, said at least one signalling signal may identify a response mode for scrolling said product, service or program element listing data and display means 21 may display said response mode for scrolling said product, service or program element listing data wherein responsive to said displaying in said predetermined manner said response mode for scrolling said product, service or program element listing data, said at least one consumer may respond via predetermined response means 24 coupled to microprocessor 16, said responding activating audibly reproducing via speech synthesizer 28 of data pre-stored in memory announcing in predetermined manner said product, service or program element listing scroll mode.

In said embodiment RAM 17 stores program element numbers with said one or plurality of source data sets in RAM 17 partitioned plurality of memory blocks of defined size and identified a plurality of respective type codes resident in said partitioned RAM 17 with uniquely addressed a plurality of respective address locations corresponding to each of said plurality of pre-assigned subject categories. Further, said partitioned RAM 17 routes said program element telephone numbers one or plurality of portions of each of said one or plurality of source data sets according to said respective pre-assigned subject categories to be stored in said respective plurality of address locations in said partitioned RAM 17 for a predetermined period of time.

In addition, said display means displays a text scroll response option wherein said display means includes LCD or display screen means for scrolling via text scroll means (not shown) coupled to microprocessor 16 said one or plurality of portions of each of said respective one or plurality of source data sets stored in said plurality of respective address locations in said partitioned RAM 17. Said scrolling further includes scrolling via said text scroll means in one or plurality of predetermined directions text of said respective predetermined subject categories displayed via said display means, selecting a subject category of said scrolled respective predetermined subject categories, scrolling via said text scroll means program listing text data listed under said selected subject category and selecting a scrolled program listing.

II. Detailed Description

This detailed description is specific to broadcast radio data transmission means and tuner 13 for simplicity of discussion. It is understood that the principles disclosed herein apply equally to broadcast and cable radio and television data transmission means and tuner 13.

i. Data Encoding Device; Source Data Set

Referring to FIG. 1 computer 1/3 generates said at least one source data set FIG. 2 comprised of a short signalling/ synchronizing code 34 which alerts the RDPU that information transmission is about to commence, product/service identification code 35 that uniquely describes or identifies said one or plurality of products, services or program elements (such as a Universal Product Code or equivalent identification code), distribution center identification code 36, code 37 identifying that broadcast radio station over which said program element or said at least one source data set is broadcast, response telephone number 38, response mode code 39 and checksum code 40 used for data error detection.

For unattributed radio stations which are not identified in said broadcast data codes, computer 1/3 generates data code set FIG. 3, which is a short data stream comprised of a short signaling/synchronizing code 41 which alerts the receiving RDPU that information transmission is about to commence, product/service identification code 42, distribution center identification code 43, response mode code 44 and checksum code 45 used for data error detection.

When a particular program element is broadcast via a broadcast radio station, computer 3 outputs said received at least one source data set. For broadcast radio station's capable of direct data transmission, e.g. FM stations with conventional Subsidiary Communications Authorization (SCA) subcarrier capability, said at least one source data set is output directly through data encoding device 4 to the radio station's data communications subcarrier channel. For radio stations incapable of direct data transmission, such as an AM broadcast radio station, or otherwise not using said subcarrier method, data code set FIG. 2/3 is converted to audio frequency format by encoding device 5 and mixed with program audio signals through mixer 6. Said direct, e.g. SCA, and indirect, e.g. embedded, data is then input to radio transmitter 7, which is connected to a transmitting antenna, but may under certain circumstances be connected to tuner 13 by a wired distribution system, i.e. cable television or fiber optic.

In one embodiment herein computer 1 may generate and transmit said at least one source data set via public or private communications link 2, which may be the public switched telephone network (PSTN), integrated services digital network (ISDN) or similar wire or wireless facility to computer 3 located at a broadcast station, where said at least one source data set is stored and transmitted at appropriate times in conjunction with the station's transmissions to the general public.

For embedded broadcast data prepared at a third party's location such as an advertising agency or production house data code set FIG. 2/3 is routed through audio encoding device 8 and mixed with the audio frequency signal of a predetermined program element. Embedded data code set FIG. 2/3 is then fed to audio recorder 9 and onto storage medium 10, or, alternatively, sent through audio transmission means 11 (such as a radio network program distribution system) to radio station mixer 6 or computer 3 to be respectively mixed in the program audio or stored as described above. Storage medium 10 is sent to radio station for later playback to listeners via playback device 12. Data code set FIG. 2/3 may be broadcast multiple times via transmitter 7 in order to facilitate error detection and correction at the receiving RDPU.

ii. Reception and Processing

The methods embodied herein are tied to and dependent upon said RDPU. Said RDPU is located at a fixed or mobile receiving location. Said RDPU may be built into broadcast radio consumer tuner 13, telephone communications device 30 (wired or cellular) or it may be a separate module either connected to telephone communications device 30 or with built-in transceiver capability.

As disclosed above, said RDPU may—for broadcast or cable television functionality—be built-into or interfaced to a broadcast or cable television tuner 13. Further, as with said radio tuner 13 RDPU, said television tuner 13 RDPU may interface to telephone communications device 30. In one embodiment disclosed herein telephone communications device 30 may attach and detach to said tuner 13 RDPU to provide telephone communications link 31 when required. Said tuner 13 RDPU may be manufactured separately from telephone communications device 30. In another embodiment disclosed herein said RDPU may attach and detach to broadcast or cable radio or television tuner 13, providing one RDPU for each of the broadcast and cable radio and television functionalities embodied herein.

Referring to FIG. 1, in the preferred embodiment the broadcast radio station's broadcast signal is intercepted by conventional broadcast radio receiving antenna (tuner) 13 and demodulated by said tuner 13. Under another embodiment within the scope of this invention data code set FIG. 2/3 encoded in radio station broadcast subcarrier is intercepted using conventional SCA receiving techniques well known to those skilled in the art, by receiver tuner 13 pre-programmed to receive the predetermined SCA kHz carrier said data code set FIG. 2/3 is encoded in. See e.g., Martinson, U.S. Pat. No. 4,360,881; Gaskill, U.S. Pat. No. 4,897,835.

The audio signal detected by tuner 13 is input to data decoding or dectecting device 14 and subcarrier data output from tuner 13 is input to interface circuit 15. The outputs of these components are then fed to microprocessor 16, which stores the received data in RAM 17. When a mobile RDPU unit receiving broadcast data as disclosed herein is temporarily out of a radio cell coverage area wherein said communications link 31 is a cellular radio communications link 31, RAM 17 stores said received data for a predetermined period of time or until said mobile RDPU unit comes within said cell coverage area to transmit response data. The program of instructions which controls the actions of microprocessor 16 is stored in read-only memory (ROM) 18, preferably electrically erasable programmable ROM (EEPROM). Non-volatile memory storage is preferably used.

iii. Display and Response means

Pertinent LED lights 19, 20 and 21, located respectively next to pushbutton 22, pushbutton 23 and pushbutton 24, may illuminate to display the one or plurality of predetermined responses or response options identified by response mode code 39/44. Immediately upon depression or activation of pushbutton 22, 23 or 24 microprocessor 16 may input stored or received speech synthesis data such as LPC encoded voice signals representative of a predetermined message or prompt to speech synthesizer 28, which converts said data into an intelligible audio frequency signal (if said received data is received as text, conventional text-to-speech conversion may be performed) that connects, via port 29, to a loudspeaker, communications device 30 transducer or the audio section of tuner 13. Speech synthesizer 28 may be programmed to voice deliver a verbal alert within a predetermined period of time after said at least one consumer depresses or activates pushbutton 22, 23 or 24 for a response option that is unavailable to be made, alerting said RDPU user of such unavailability.

When pushbuttons 22, 23 or 24 is depressed, microprocessor 16 may generate and store in RAM 17 response data stream FIG. 4 and may also send data stream FIG. 4 to communications device 30, which then connects the RDPU via wire or wireless communications link 31 to computer 32 for predetermined processing. If a connection cannot be established immediately, said RDPU may automatically repeat said attempts to make connection until a predetermined time limit is reached or connection is achieved, when said response data stream FIG. 4 is retrieved from RAM 17 and transmitted via communications link 31 to said computer 32 for said predetermined processing.

Data stream FIG. 4 is comprised of a short signalling/synchronizing code 46 which alerts computer 32 to receive data, product/service identification code 47 that uniquely describes the one or plurality of products, services or program elements identified by product/service identification code 35/42 being responded to by said at least one consumer, distribution center identification code 48, code 49 identifying the radio station over which the associated program element is broadcast, the date and time code 50 identifying the date and time that said RDPU received data code set FIG. 2/3, a code 51 representing the receiving location, responding RDPU identification code 52, response mode code 53 identifying the response made and a checksum code 54 used for data error detection. Said data stream FIG. 4 may be transmitted several times in order to facilitate error detection and correction at computer 32.

Said wireless communications link 31 may include RDPU transceiver means (not shown) and one or a plurality of fixed transceiver sites (not shown) connected via communications link 31 to computer 32. Said referenced wireless or radio frequency transmission structure is well known in the art and needs no further description. See, e.g. Clagett, U.S. Pat. No. 5,105,197, which is incorporated herein by reference.

iv. Location Sensing and TTL Interface Circuitry Tuner 13 may be coupled to location sensing device (not shown) such as zip code location identifier for fixed RDPU units and for mobile RDPU units GPS or LORAN C receiver or cellular radio location means. Said location sensing device may be used for any locator purpose. One such purpose may be for microprocessor 16 to compare the location of one of said mobile RDPU units with the location of a retail outlet for a radio advertiser, said retail location information pre-stored in RAM 17 or ROM 18 such as from a map stored in optical disk as disclosed in LaRue, U.S. Pat. No. 5,274,560 (which is incorporated herein by reference). Speech synthesizer 28 may voice deliver directions to said retail location from the location of said mobile RDPU unit. Alternatively, said RDPU unit location identification may be incorporated into an output set locator code 51 and transmitted in a response data set FIG. 4 via telephone communications link 31 to computer 32 for predetermined processing.

Said RDPU may have interface circuitry 27 means for external input via input port 26 of data which uniquely describes the location of said RDPU from data output derived from conventional external location sensing device such as a LORAN C or GPS receiver or means for receiving cell location identity codes for cellular radio or microcell RF systems (as used herein said term "cellular radio" includes any cellular or microcellular RF systems) in which said RDPU is located at a given point in time, storing location data code 51 in RAM 17 and incorporating said code 51 into an output data set FIG. 4. Location data code 51 may be used by computer 32 to ascertain the location of said RDPU and provide the user of said RDPU with voice delivered, text or graphic display directions to a predetermined location of interest such as a retail outlet for an advertising merchant.

Further said RDPU may have interface circuitry 15 means between said RDPU and an interfaced digital radio receiver/tuner 13 capable of having its tuning frequency controlled by an electrical signal, to sense via conventional digital TTL (transistor logic) circuitry (not shown) the radio frequency or channel to which receiver/tuner 13 is tuned at a given point in time. Said RDPU may further have means to incorporate data identifying said frequency or channel tuned to into an output data set FIG. 4 for transmission via communications link 31 as described above with respect to location data code 51.

Date and time code 50 may used by computer 32 as back up means of determining the specific program element to which said at least one consumer is responding. Computer 32 compares the date/time indicated by said code 50 with the program log of the radio station identified in said output data set containing said TTL-derived frequency or channel data. Said radio station program log data, previously transmitted from the radio station to computer 32 by conventional means, lists the times and dates of airing of all radio station program elements.

V. Program Listing Text Scroll

As disclosed above, RAM 17 may be partitioned into blocks of defined size, which blocks are identified by type codes resident in said partitioned memory. Broadcast data code set FIG. 2/3 intended for predetermined type codes—such as program listing data falling under a subject category type code—includes address information in predetermined data packet header sections corresponding to said respective memory type codes. When said RAM 17 receives and decodes said address information it routes said codes to be stored in the respective memory unit corresponding to the address indicated in said category code, to be retrieved later by microprocessor 16 and input to display means such as LCD display means to be text scrolled in a predetermined order such as alphabetically by category and FIFO by specific program element, product or service listing.

Predetermined program listing codes may transmitted via a predetermined subcarrier kHz channel at a predetermined time, preferably every quarter hour of time, with said RDPU preprogrammed to receive said subcarrier transmissions at or about said predetermined transmission time and decode said received subcarrier data in the same decoding manner as described above. Further, radio station subcarriers may be used to transmit a plurality of FIG. 2/3 code sets identifying a plurality of program elements scheduled to broadcast on at least one broadcast radio station in at least one given market area during a predetermined time period, preferably quarter hour program listing intervals. Said respective subject category and program element or product/service listings are stored in said address locations in said partitioned RAM 17 for a predetermined period of time, after which said respective listings are automatically deleted.

Using pushbutton 22 and 23 response means said stored program element or product/service listings may be scrolled by pushbutton 22 up and pushbutton 23 down. Said pushbutton 22 may be depressed or activated remotely via conventional remote control means (not shown) coupled to microprocessor 16 within a predetermined period of time after a desired subject category is displayed, activating LCD display in a predetermined order of one or plurality of program elements, products or services listed under said selected subject category. Within a predetermined time period after said LCD display commences displaying a desired program element, product or service listed under said selected subject category pushbutton 22 may be depressed or activated again to stop said scrolling at said desired program element, product or service listing. With a program element—said LCD display may display in a predetermined order respective one or plurality of broadcast radio stations scheduled to broadcast said program element and the date(s)/time(s) scheduled for broadcast and response option(s) including autodail of telephone number for further interaction with said identified program element such as purchase/order, information request or voice contact. In other words, the RDPU user may have the option of waiting for said scheduled broadcast/transmission date/time to conduct one or plurality of said response options or to immediately select said one or plurality of response options via respective pushbuttons 22, 23 or 24 on demand. Said scroll mode is activated/deactivated via scroll switch (not shown) coupled to microprocessor 16.

Clearly, numerous modifications and variations of the present invention are possible in light of the above teachings. It is therefore to be understood that, within the scope and spirit of the claims made herein, the invention may be practiced otherwise than as specifically described herein, the invention may be modified in arrangement and detail without departing from such scope and spirit and, further, the utility described herein is by way of example, with the understanding that there exists other utility and functionality of the methods and apparatus embodied herein. What is claimed is all modifications coming within the scope and spirit of the following claims:

I claim:

1. A method for interactive broadcast or cable radio or television comprising the steps of:

encoding via data encoding means for transmission via broadcast or cable radio or television data transmission means a data set consisting of a plurality of portions including A) a code identifying a predetermined telephone number available to be automatically dialed in response to a program element such as a musical recording, video, song, show or other program material intended to entertain, live or recorded speech intended to inform, a short announcement or commercial advertisement, political advertising, a public service announcement or an Emergency Alert System (EAS) event message or a product or service marketed or otherwise identified in said program element and B) said predetermined telephone number;

transmitting via said broadcast or cable radio or television data transmission means coupled to said data encoding means said data set to respective broadcast or cable radio or television data receiver means;

receiving said data set via said respective broadcast or cable radio or television data receiver means;

detecting said code via detecting means coupled to said respective broadcast or cable radio or television data receiver means;

processing in predetermined manner one or plurality of portions of said data set including said predetermined telephone number via data processing means coupled to said detecting means;

storing at least one portion of said data set including said predetermined telephone number via memory means coupled to said data processing means;

indicating via visual display means coupled to said data processing means said predetermined telephone number is available to be automatically dialed in response to said program element;

activating via activation means coupled to said data processing means predetermined telephone means comprising automatic dialing means to automatically dial said predetermined telephone number;

automatically dialing said predetermined telephone number via said predetermined telephone means comprising automatic dialing means coupled to said data processing means and audibly reproducing predetermined data via audible reproduction means comprising speech synthesizer means and audio system means coupled to said data processing means.

2. A method for interactive broadcast or cable radio or television comprising the steps of:

receiving via respective broadcast or cable radio or television data receiver means a data Bet consisting of a plurality of portions including A) a code identifying a predetermined telephone number available to be automatically dialed in response to a program element such as a musical recording, video, song, show or other program material intended to entertain, live or recorded speech intended to inform, a short announcement or commercial advertisement, political advertising, a public service announcement or an Emergency Alert System (EAS) event message or a product or service marketed or otherwise identified in said program element and B) said predetermined telephone number;

detecting said code via detecting means coupled to said respective broadcast or cable radio or television data receiver means;

processing in predetermined manner one or plurality of portions of said data set including said predetermined telephone number via data processing means coupled to said detecting means;

storing at least one portion of said data set including said predetermined telephone number via memory means coupled to said data processing means;

indicating via visual display means coupled to said data processing means said predetermined telephone number is available to be automatically dialed in response to said program element;

activating via activation means coupled to said data processing means predetermined telephone means comprising automatic dialing means to automatically dial said predetermined telephone number;

automatically dialing said predetermined telephone number via said predetermined telephone means comprising automatic dialing means coupled to said data processing means and audibly reproducing predetermined data via audible reproduction means comprising speech synthesizer means and audio system means coupled to said data processing means.

3. A method according to claim 2 wherein said respective broadcast or cable radio or television data receiver means comprises respective broadcast or cable radio or television tuner means.

4. A method according to claim 2 wherein said respective broadcast or cable radio or television data receiver means comprises data channel means.

5. A method according to claim 2 wherein said respective broadcast or cable radio or television data receiver means comprises program audio channel means.

6. A method according to claim 2 wherein said code further identifies address information and said detecting via said detecting means further detects said address information.

7. A method according to claim 2 wherein said code further identifies geographic address information and said detecting via said detecting means further detects said geographic address information.

8. A method according to claim 2 wherein said visual display means comprises LED means.

9. A method according to claim 2 wherein said visual display means comprises LCD or text display means.

10. A method according to claim 2 wherein said activation means comprises pushbutton means.

11. A method according to claim 2 wherein said activation means comprises keypad means.

12. A method according to claim 2 wherein said activation means comprises voice recognition unit (VRU) means.

13. A method according to claim 2 wherein said activation means comprises said code.

14. A method according to claim 2 wherein said predetermined telephone means comprises wireline telephone means.

15. A method according to claim 2 wherein said predetermined telephone means comprises cellular telephone means.

16. A method according to claim 2 wherein at least a portion of said predetermined data audibly reproduced via said audible reproduction means is preprogrammed.

17. A method according to claim 2 wherein said data set further includes at least a portion of said predetermined data audibly reproduced via said audible reproduction means.

18. A method according to claim 2 wherein said respective broadcast or cable radio or television data receiver means comprises respective broadcast or cable radio or television tuner means and said audibly reproducing further comprises muting program audio signals output from said respective broadcast or cable radio or television tuner means.

19. A method according to claim 2 wherein said respective broadcast or cable radio or television data receiver means comprises respective broadcast or cable radio or television tuner means and said audibly reproducing further comprises attenuating program audio signals output from said respective broadcast or cable radio or television tuner means.

20. A method according to claim 2 wherein said predetermined data audibly reproduced via said audible reproduction means further includes data representative of a call status message.

21. A method according to claim 2 wherein said predetermined data audibly reproduced via said audible reproduction means further includes a prompt prompting predetermined response via predetermined response means coupled to said data processing means.

22. A method according to claim 2 wherein said data set further includes program element listing text data listed as program element listing information by predetermined subject categories;

said storing further comprises storing said program element listing text data with telephone number data in memory blocks of defined size identified by respective type codes and uniquely addressed respective address locations corresponding to said predetermined subject categories and said visual display means further comprises:
  means for scrolling in a predetermined direction predetermined text data identifying a plurality of said predetermined subject categories;
  means for selecting a subject category from said scrolled predetermined text data identifying said plurality of predetermined subject categories;
  means for scrolling in a predetermined direction text data representative of program element listing information listed under said selected subject category and
  means for selecting a program element from said scrolled text data representative of said program element listing information to respond by automatically dialing said predetermined telephone number.

23. An apparatus for interactive broadcast or cable radio or television comprising:

respective broadcast or cable radio or television data receiver means for receiving a data set consisting of a plurality of portions including
  A) a code identifying a predetermined telephone number available to be automatically dialed in response to a program element such as a musical recording, video, song, show or other program material intended to entertain, live or recorded speech intended to inform, a short announcement or commercial advertisement, political advertising, a public service announcement or an Emergency Alert System (EAS) event message or a product or service marketed or otherwise identified in said program element and
  B) said predetermined telephone number;

detecting means coupled to said respective broadcast or cable radio or television data receiver means for detecting said code;

data processing means coupled to said detecting means for processing in predetermined manner one or plurality of portions of said data set including said predetermined telephone number;

memory means coupled to said data processing means for storing at least one portion of said data set including said predetermined telephone number;

visual display means coupled to said data processing means for indicating said predetermined telephone number is available to be automatically dialed in response to said program element;

activation means coupled to said data processing means for activating predetermined telephone means comprising automatic dialing means to automatically dial said predetermined telephone number;

said predetermined telephone means comprising automatic dialing means coupled to said data processing means for automatically dialing said predetermined telephone number and audible reproduction means comprising speech synthesizer means and audio system means coupled to said data processing means for audibly reproducing predetermined data.

24. An apparatus according to claim 23 wherein
said respective broadcast or cable radio or television data receiver means comprises respective broadcast or cable radio or television tuner means.

25. An apparatus according to claim 23 wherein
said respective broadcast radio data receiver means comprises satellite Digital Audio Broadcasting (DAB) tuner means.

26. An apparatus according to claim 23 wherein
said respective broadcast radio data receiver means comprises terrestrial Digital Audio Broadcasting (DAB) tuner means.

27. An apparatus according to claim 23 wherein
said respective broadcast or cable radio or television data receiver means comprises data channel means.

28. An apparatus according to claim 23 wherein
said respective broadcast or cable radio or television data receiver means comprises program audio channel means.

29. An apparatus according to claim 23 wherein
said code further identifies address information and
said detecting means further detects said address information.

30. An apparatus according to claim 23 wherein
said code further identifies receiver address information and
said detecting means further detects said receiver address information.

31. An apparatus according to claim 23 wherein
said code further identifies geographic address information and
said detecting means further detects said geographic address information.

32. An apparatus according to claim 23 wherein
said code further identifies GPS address information and
said detecting means further detects said GPS address information.

33. An apparatus according to claim 23 wherein
said visual display means comprises LED means.

34. An apparatus according to claim 23 wherein
said visual display means comprises LCD or text display means.

35. An apparatus according to claim 23 wherein
said activation means comprises pushbutton means.

36. An apparatus according to claim 23 wherein
said activation means comprises keypad means.

37. An apparatus according to claim 23 wherein
said activation means comprises voice recognition unit (VRU) means.

38. An apparatus according to claim 23 wherein
said activation means comprises said code.

39. An apparatus according to claim 23 wherein
said speech synthesizer means comprises DTMF conversion means to convert said predetermined telephone number into DTMF dialing signals to dial said predetermined telephone number via said predetermined telephone means comprising automatic dialing means.

40. An apparatus according to claim 23 wherein
said predetermined telephone means comprises wireline telephone means.

41. An apparatus according to claim 23 wherein
said predetermined telephone means comprises cellular telephone means.

42. An apparatus according to claim 23 wherein
at least a portion of said predetermined data audibly reproduced via said audible reproduction means is preprogrammed.

43. An apparatus according to claim 23 wherein
at least a portion of said predetermined data audibly reproduced via said audible reproduction means is preprogrammed in said speech synthesizer means.

44. An apparatus according to claim 23 wherein
at least a portion of said predetermined data audibly reproduced via said audible reproduction means is preprogrammed in said memory means.

45. An apparatus according to claim 23 wherein
said data set further includes at least a portion of said predetermined data audibly reproduced via said audible reproduction means.

46. An apparatus according to claim 23 wherein
said predetermined data audibly reproduced via said audible reproduction means comprises LPC signals and
said speech synthesizer means comprises LPC speech synthesizer means.

47. An apparatus according to claim 23 wherein
said respective broadcast or cable radio or television data receiver means comprises respective broadcast or cable radio or television tuner means and
said audio system means comprises the audio system means coupled to said respective broadcast or cable radio or television tuner means.

48. An apparatus according to claim 23 wherein
said respective broadcast or cable radio or television data receiver means comprises respective broadcast or cable radio or television tuner means and
said audible reproduction means further comprises muting means for muting program audio signals output from said respective broadcast or cable radio or television tuner means.

49. An apparatus according to claim 23 wherein
said respective broadcast or cable radio or television data receiver means comprises respective broadcast or cable radio or television tuner means and
said audible reproduction means further comprises attenuating means for attenuating program audio signals output from said respective broadcast or cable radio or television tuner means.

50. An apparatus according to claim 23 wherein
said predetermined data audibly reproduced via said audible reproduction means includes data representative of a call status message.

51. An apparatus according to claim 23 wherein
said predetermined data audibly reproduced via said audible reproduction means includes a prompt prompting predetermined response via predetermined response means coupled to said data processing means and said predetermined response means comprises said predetermined telephone means.

52. An apparatus according to claim 23 wherein said predetermined data audibly reproduced via said audible reproduction means includes a prompt prompting predetermined response via predetermined response means coupled to said data processing means and said predetermined response means comprises affirmative response pushbutton means.

53. An apparatus according to claim 23 wherein said predetermined data audibly reproduced via said audible reproduction means includes a prompt prompting predetermined response via predetermined response means coupled to said data processing means and said predetermined response means comprises keypad means.

54. An apparatus according to claim 23 wherein said predetermined data audibly reproduced via said audible reproduction means includes a prompt prompting predetermined response via predetermined response means coupled to said data processing means and said predetermined response means comprises voice recognition unit (VRU) means.

55. An apparatus according to claim 23 wherein said data set further includes program element listing text data listed as program element listing information by predetermined subject categories;

said memory means further comprises partitioned memory means for storing said program element listing text data with telephone number data in memory blocks of defined size identified by respective type codes and uniquely addressed respective address locations corresponding to said predetermined subject categories and said visual display means further comprises text scroll means for scrolling in a predetermined direction predetermined text data identifying a plurality of said predetermined subject categories;

means for selecting a subject category from said scrolled predetermined text data identifying said plurality of predetermined subject categories;

text scroll means for scrolling in a predetermined direction text data representative of program element listing information listed under said selected subject category and means for selecting a program element from said scrolled text data representative of said program element listing information to respond by automatically dialing said predetermined telephone number.

\* \* \* \* \*